(12) United States Patent
Coates et al.

(10) Patent No.: US 7,625,531 B1
(45) Date of Patent: Dec. 1, 2009

(54) FUEL INJECTOR UTILIZING NON-THERMAL PLASMA ACTIVATION

(75) Inventors: Don M. Coates, Santa Fe, NM (US); Louis A. Rosocha, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 880 days.

(21) Appl. No.: 11/218,792

(22) Filed: Sep. 1, 2005

(51) Int. Cl.
*B01J 19/08* (2006.01)
(52) U.S. Cl. .................................. 422/186.04
(58) Field of Classification Search ............. 422/186.04
See application file for complete search history.

(56) References Cited

U.S. PATENT DOCUMENTS

| | | | |
|---|---|---|---|
| 5,546,747 A * | 8/1996 | Colletta et al. ............... 60/275 |
| 6,139,694 A * | 10/2000 | Rogers et al. ............... 204/177 |
| 6,322,757 B1 | 11/2001 | Cohn et al. |
| 6,365,112 B1 * | 4/2002 | Babko-Malyi et al. . 422/186.04 |
| 6,606,855 B1 | 8/2003 | Kong et al. |
| 6,959,538 B2 * | 11/2005 | Cho et al. ..................... 60/275 |
| 7,043,902 B2 * | 5/2006 | Nakanishi et al. ............. 60/286 |

FOREIGN PATENT DOCUMENTS

GB      972302      * 10/1964

* cited by examiner

*Primary Examiner*—Kishor Mayekar
(74) *Attorney, Agent, or Firm*—Mark N. Fitzgerald; Meredith H. Schoenfeld (57) ABSTRACT

A non-thermal plasma assisted combustion fuel injector that uses an inner and outer electrode to create an electric field from a high voltage power supply. A dielectric material is operatively disposed between the two electrodes to prevent arcing and to promote the formation of a non-thermal plasma. A fuel injector, which converts a liquid fuel into a dispersed mist, vapor, or aerosolized fuel, injects into the non-thermal plasma generating energetic electrons and other highly reactive chemical species.

16 Claims, 8 Drawing Sheets

FUEL INJECTOR UTILIZING NON-THERMAL PLASMA ACTIVATION

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to non-thermal plasmas, and, more particularly, to the use of non-thermal plasmas in the design of a fuel injector that feeds internal combustion engines or other combustion devices employing fuel injectors.

BACKGROUND OF THE INVENTION

The present invention is a device that employs electrical discharges/non-thermal plasmas in a gaseous medium to activate a fuel derived from a fuel injector to promote more effective and efficient combustion. In non-thermal plasmas, the electrons are 'hot', while the ions and neutral species are 'cold'—which results in little waste enthalpy being deposited in a process gas stream. This is in contrast to thermal plasmas, where the electron, ion, and neutral-species energies are in thermal equilibrium (or 'hot') and considerable waste heat is deposited in the process gas.

The present invention utilizes a type of electrical discharge called a dielectric barrier discharge (DBD) or silent discharge plasma (SDP) to: 1) break up large organic fuel molecules into smaller ones that are more easily and completely combusted; and 2) create highly reactive free-radical chemical species that can promote more efficient combustion by their strong "redox" power (fuels become strong reducing agents, oxygen becomes more oxidizing) or by their ability to promote combustion-sustaining chain reactions or chain reactions that further generate active species. This device is envisioned for application to a variety of internal combustion engines, such as automobile engines and all turbine engines that normally employ fuel injectors.

U.S. Pat. No. 6,606,855, Plasma Reforming and Partial Oxidation of Hydrocarbon Fuel Vapor to Produce Synthesis Gas And/Or Hydrogen Gas, by Kong et al., teaches methods and systems for treating vapors from fuels with thermal or non-thermal plasmas to promote reforming reactions between the fuel vapor and re-directed exhaust gases to produce carbon monoxide and hydrogen gas, partial oxidation reactions between the fuel vapor and air to produce carbon monoxide and hydrogen gas, or direct hydrogen and carbon particle production from the fuel vapor. However, a problem with the reactions taught in Kong et al. includes the fact that hydrocarbon gases, when formed, are accompanied with carbon particles (ie. Soot). Introduction of carbon particles into a working engine is considered undesirable due to the engine damage that can be caused and, in particular, the difficulty in combusting the carbon particles.

In contrast, the present invention is a specific non-thermal plasma fuel injector, designed to make free radicals and more easily-combusted cracked species out of injected fuel to enhance combustion with no formation of soot. There are no oxidative reactions as in Kong et al. and only fuel is treated, not O2 or exhaust gases as described in Kong et al.

U.S. Pat. No. 6,322,757, Low Power Compact Plasma Fuel Converter, by Cohn et al., also teaches the conversion of fuel, particularly into molecular hydrogen ($H_2$) and carbon monoxide (CO). The invention of Cohn et al, like Kong et al., suffers from rampant soot production, as well as electrode erosion (because the Plasmatron converter actually employs a hot-arc, thermal plasma, rather than a low-temperature, non-thermal plasma). Further, it is not clearly evident that molecular hydrogen is the key promoter of more stable/complete combustion.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a non-thermal plasma assisted combustion fuel injector that uses a first and second electrode to create an electric field from a high voltage power supply. A dielectric material is operatively disposed between the two electrodes to prevent arcing and to promote the formation of a non-thermal plasma. A fuel injector, which converts a liquid fuel into a dispersed mist, vapor, or aerosolized fuel, injects into the non-thermal plasma generating energetic electrons and other highly reactive chemical species.

In another embodiment, the present invention includes a method for cracking fuel using a fuel injector to create a fuel mist and then subjecting the fuel mist to a non-thermal plasma created between an outer electrode and an inner electrode, thereby cracking the fuel mist and creating fuel fragments

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention uses a silent-discharge/dielectric-barrier non-thermal plasma (NTP) reactor to generate energetic electrons and other highly reactive chemical species (such as free radicals) in a fuel that feeds internal combustion engines, or other combustion devices employing fuel injectors. The highly reactive chemical species: 1) break up large organic fuel molecules into smaller ones that are more easily and completely combusted; and 2) create highly reactive free-radical chemical species that can promote more efficient combustion through enhanced reactive power, ability to promote combustion-sustaining chain reactions, and follow on chain reactions that generate more active species.

Figure 1:
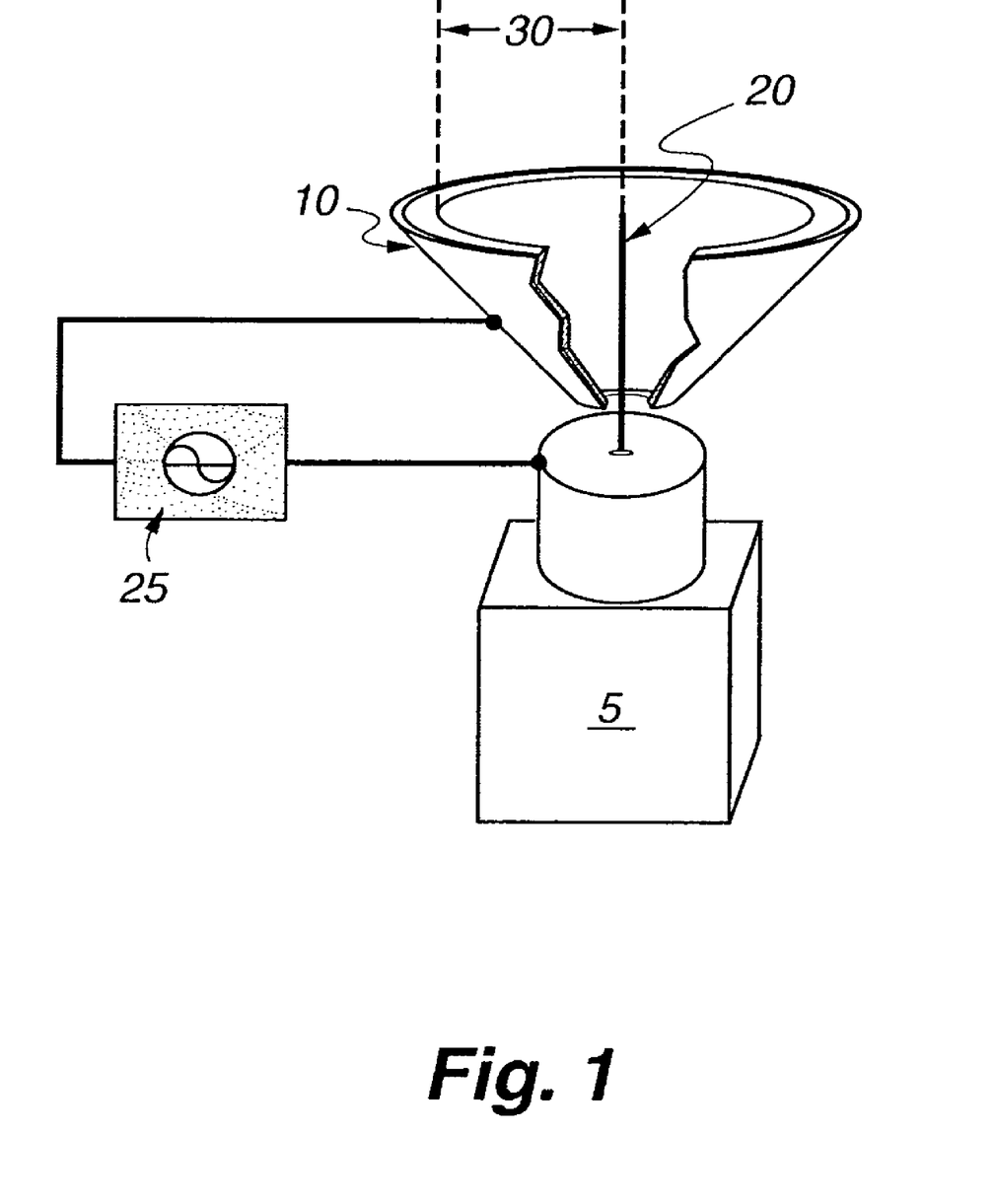
FIG. 1 pictorially shows one embodiment of the plasma assisted combustion fuel injector device.

Referring now to FIG. 1, NTPs can be created by several types of electric discharge configurations known to those skilled in the art. In the present invention, the reactor makes use of a dielectric-barrier discharge arrangement. Here, two conducting electrodes, outer electrode 10 and inner electrode 20, one or both of which are covered by a dielectric material, are separated by gas-containing gap 30. Gap 30 may range from about 0.5 mm to 20 mm.

Dielectric materials that may be used include, but are not limited to: dielectric ceramics such as alumina, porcelain, Macor® machinable glass ceramic, glasses of various types, high temperature plastics such as Teflon®, polimides and polyamides, dielectrics such as those used in capacitors (e.g. Mylar® and Kapton®-DuPont Company), and rubber compounds.

Materials used for the electrodes may include, but are not limited to: conductive, corrosion-resistant metals, such as stainless steel alloys, tungsten and tungsten alloys, and any other refractory metals and alloys that are resistant to erosion in the plasma environment; and, carbon-based composites, carbon nanotubes, and graphitic surfaces, which are particularly resistant to etching in plasma environments (such as those used in plasma television electrodes or other related applications).

One or both electrodes must be shielded from the other electrode by a dielectric material so that arcing is avoided and streamer formation (a streamer is a fast-time microdischarge characteristic of DBDs) is induced, i.e. a dielectric plasma is made. Electrodes can be made with sharp points, roughness or edges to enhance high field concentrations so as to aid breakdown and thus plasma initiation A high-voltage source sufficient to electrically break down (i.e, make conductive, make a plasma) the fuel (typical range of 1 kV to 50 kV, depending on the fuel and the gap spacing) (alternating current, frequency in a typical range of 10 Hz-20 kHz; or voltage pulse) is applied to electrodes 10 and 20 creating electrical-discharge streamers in the gas passing between. An inverter and step-up transformer produces the high voltage that boots the 12 V DC battery supply in a typical automotive electrical system, to the required voltage. Such circuits can be made very small and lightweight, using today's advanced semiconductor switching inverter/converter circuits.

The discharges are the source of the active non-thermal plasma. The embodiment presented here is a cylindrical, coaxial dielectric barrier discharge/silent discharge plasma (DBD/SDP) reactor, however, other arrangements (e.g., planar, rectangular) may also be employed by one skilled in the art. Additionally, other embodiments utilizing clusters of reactors can also be employed by on skilled in the art. The wave form of the alternating current can be sine, square, or complex, so as to aid plasma initiation by the applied voltage rise time, and to promote electrode self-cleaning that is aided by the breakdown follow-on wave shape.

Figure 2:
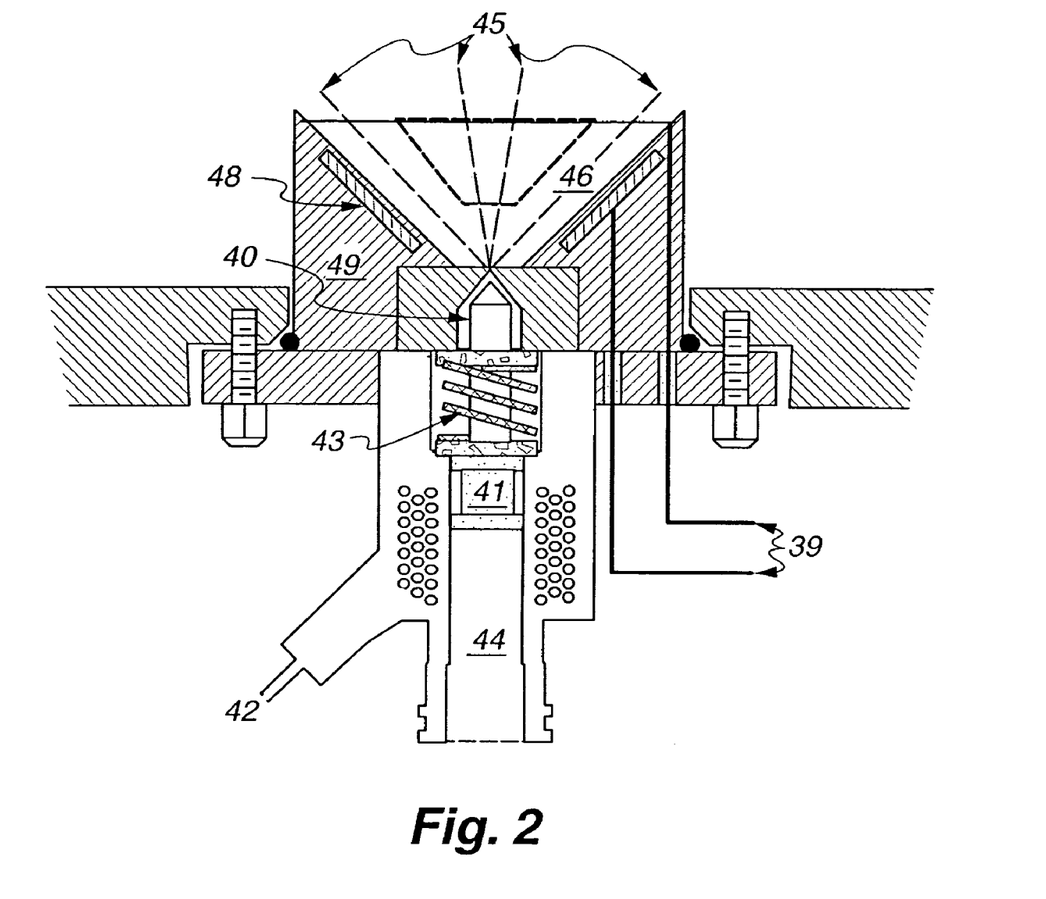
FIG. 2 pictorially shows a cross section of one embodiment of the plasma assisted combustion fuel injector device.

Referring now to FIG. 2, a cross section of one embodiment of the plasma assisted combustion fuel injector device (PACFI), pintle needle valve 40 is opened and closed by activation of solenoid 41 through input wires 42. Spring 43 returns valve 40 to the closed position when solenoid 41 is not energized. When valve 40 is open, fuel from hose connection 44 sprays out as an atomized mist 45 into conical chamber 46. A nonthermal plasma is created within conical chamber 46 by the input of a high voltage alternating current through power wires 39 that are connected to the external "basket" electrode 47 and outer electrode 48 that resides within insulator block 49. Insulator block 49 is made from a dielectric material.

Figure 3:
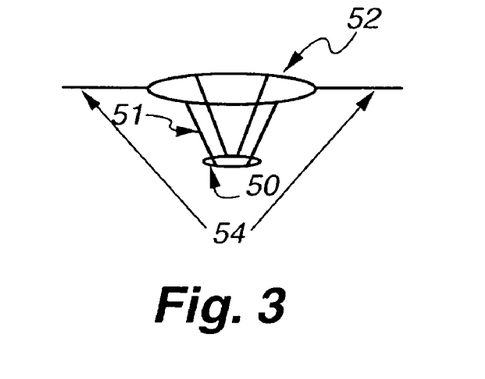
FIG. 3 pictorially shows a basket electrode embodiment.

Referring also now to FIG. 3, where the inner electrode configuration is basket electrode 47 that is composed of wire hoop 50 connected with vertical wires 51 to larger diameter wire hoop 52 (additional wire hoops may also be employed between 50 and 51). Basket electrode 47 is suspended from insulator block 53 by horizontal support wires 54. The open structure of basket electrode 47 allows atomized mist 45 essentially unrestricted passage and yet provides the electrode surface required to generate the nonthermal plasma.

Figure 4A:
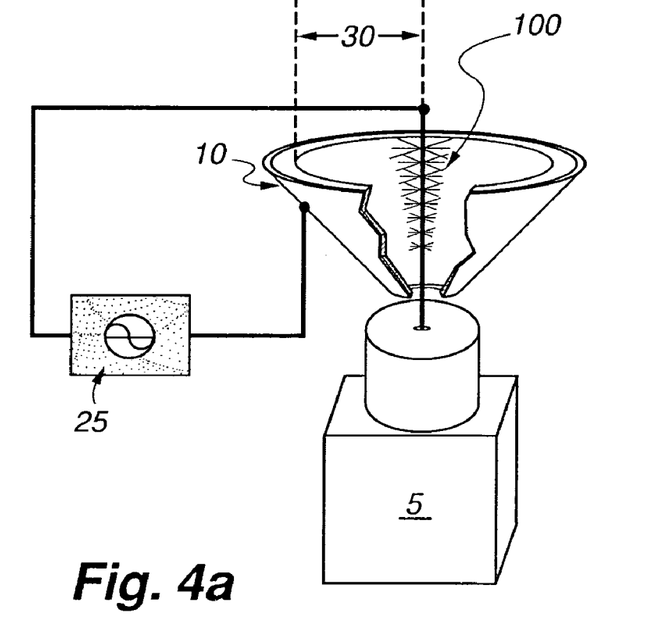
FIG. 4a pictorially shows a tapered "brush" inner electrode embodiment.
Figure 4B:
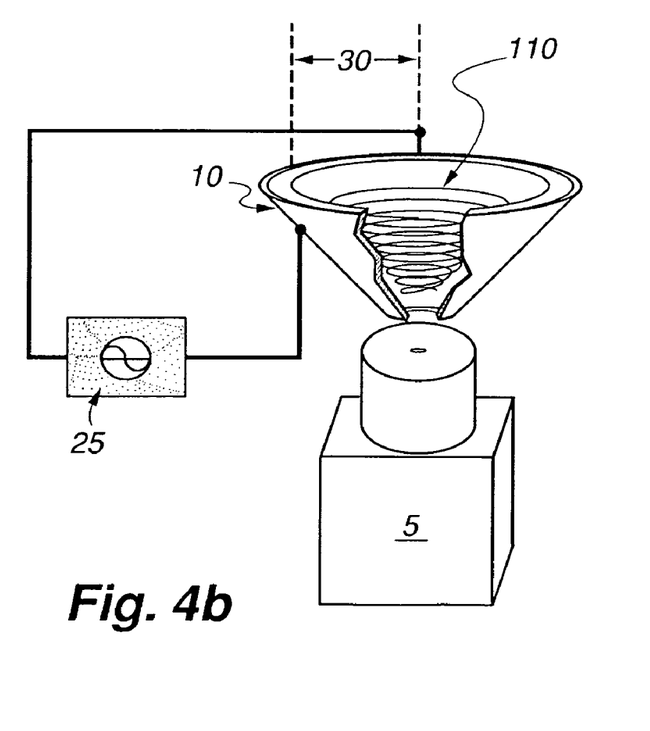
FIG. 4b pictorially shows a spiral wire inner electrode embodiment.
Figure 4C:
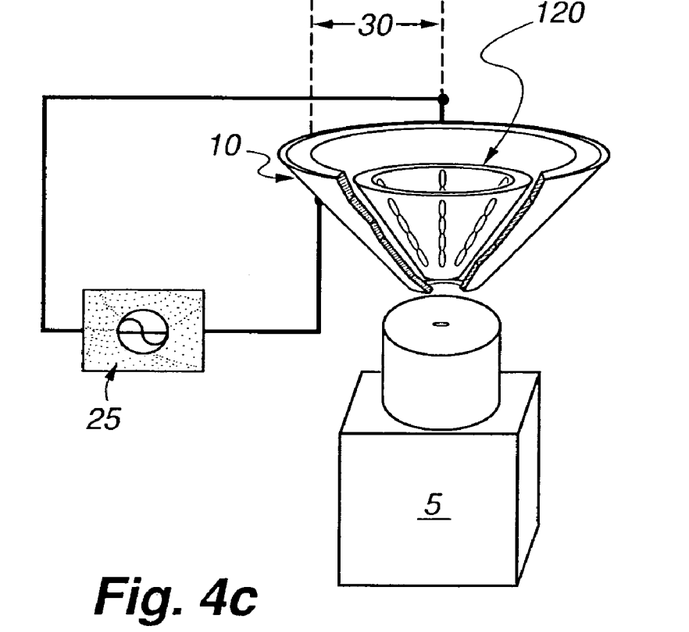
FIG. 4c pictorially shows a perforated cone inner electrode embodiment.
Figure 4D:
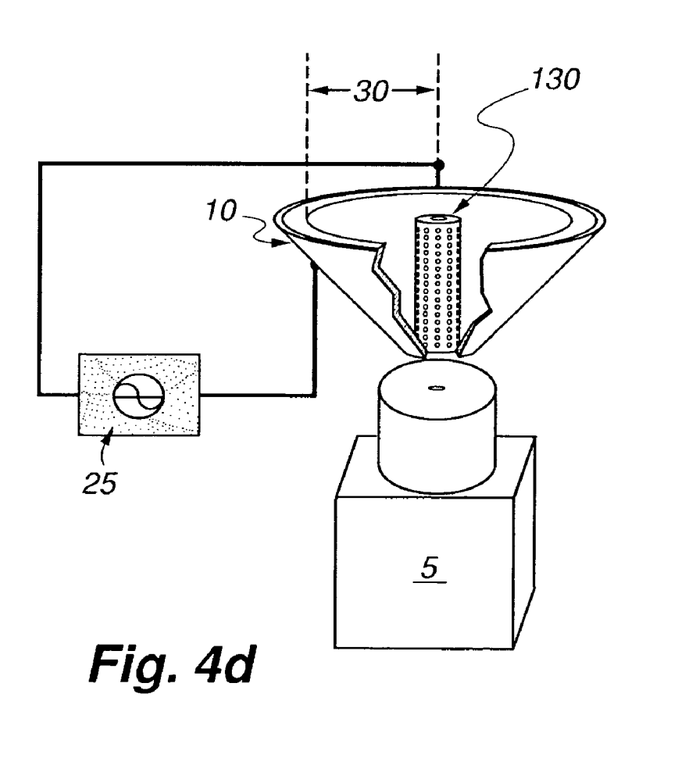
FIG. 4d pictorially shows a perforated cylinder inner electrode embodiment.
Figure 4E:
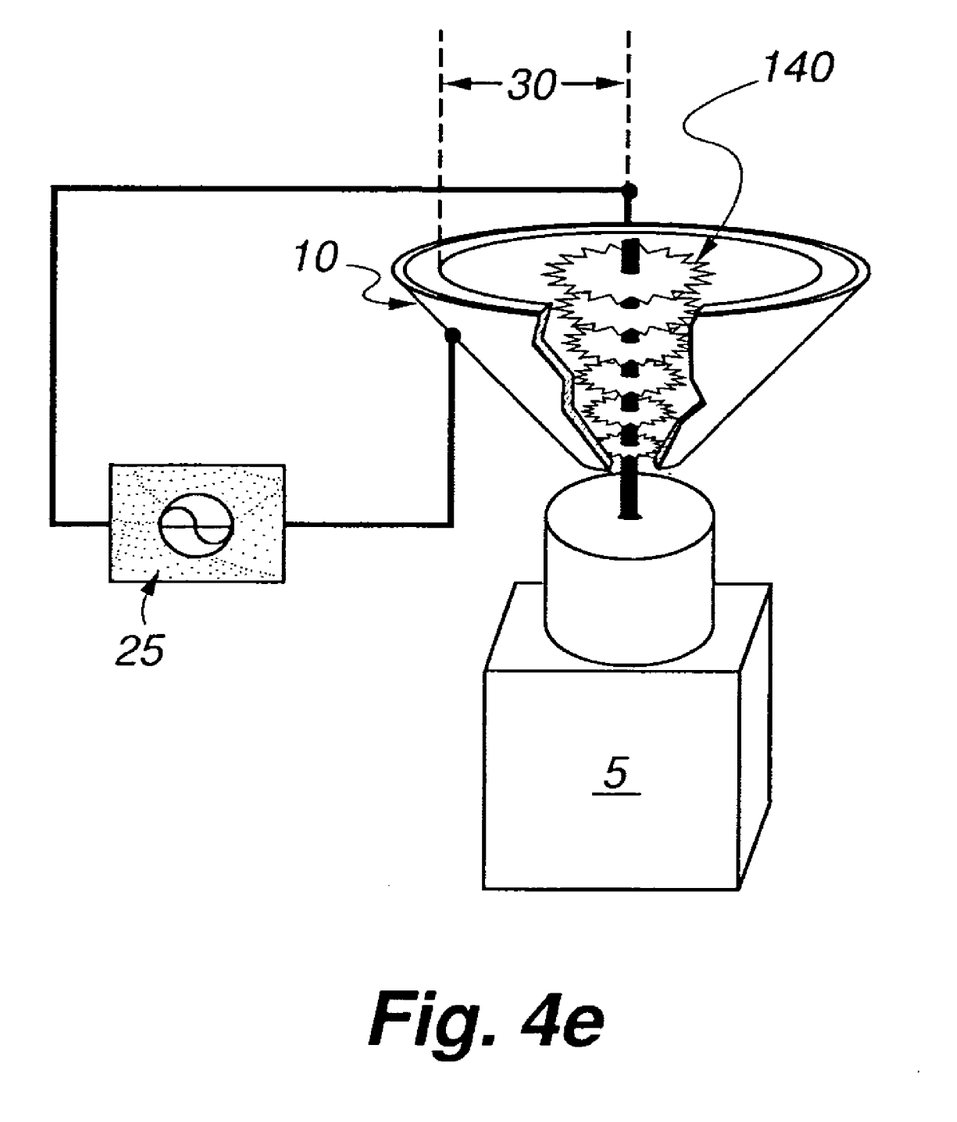
FIG. 4e pictorially shows a series of pointed washers used as an inner electrode embodiment.

Other inner electrode configurations provide electric field enhancement within gap 30 so as to reduce the power required to generate the required strength of non-thermal plasma. FIG. 4a is an embodiment where inner electrode 100 is configured in an array of wires in a tapered "brush" configuration. FIG. 4b is an embodiment where inner electrode 110 is a spiral wire. FIG. 4c is an embodiment where inner electrode 120 is a cone with electric field-enhancing perforations throughout. FIG. 4d is an embodiment where inner electrode 130 is a cylinder with electric field-enhancing perforations throughout. FIG. 4e is an embodiment where inner electrode 140 is a series of pointed washers. All of the aforementioned inner electrode embodiments may be made from stainless steel, copper, tungsten, tungsten alloys, refractory metals, and carbon-based composite.

A dielectric barrier electrode configuration creates high-energy streamers that produce both intense ultra violet light and strong electric/magnetic fields that are more effective in generating cracked (i.e. lower molecular weight), chemically different fuels, compared to a corona discharge processes. Thus, for example, a residual gas analyzer looking at the effect of plasma cracking of propane shows that methane sized free-radical fragments is created by the present invention. Methane, being of lower molecular weight, burns at a higher rate than does propane, and, thus, more efficiently. Thus, lower quality fuels may be used to replace previously necessary high-grade fuels, e.g. use diesel fuel in a jet engine in lieu of Jet A.

By improving the burning propensity of fuels by converting them to smaller compounds, it is now possible to dilute the combustion mixture with more air than was possible with prior art inventions. Increasing dilution with air improves reduction in the amount of nitrogen oxides (NOx) that is created by dropping the overall combustion temperature. Thus, there are at least three important results provided by the present invention: first, less fuel is consumed due to the enhanced combustion efficiency; second, there is a reduction in the number of unburned hydrocarbons; and third, lower amounts of oxides of nitrogen produced.

Testing

Figure 5:
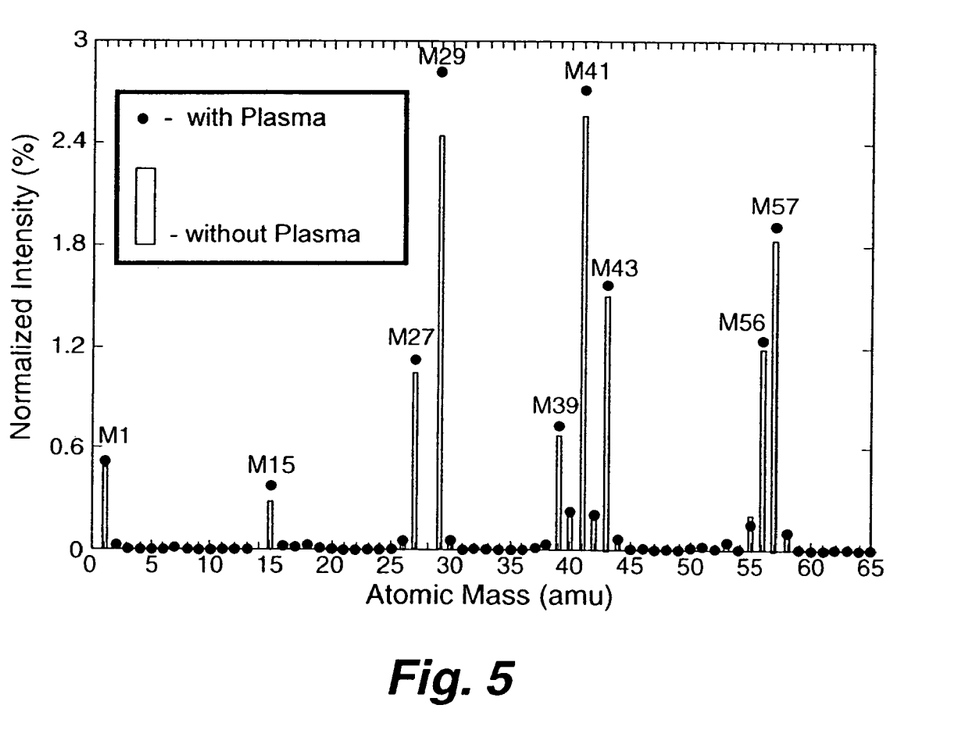
FIG. 5 graphically shows the test results using a tapered "brush" electrode embodiment.

Referring now to FIG. 5, graphically showing the results of testing the center electrode 100 embodiment shown in FIG. 4a. Non-thermal plasma created in the gap between the brush center electrode and the dielectric cone decomposes ("cracks") the atomized liquid fuel into simpler hydrocarbons. For this test, the PACFI unit was mounted inside a clear plastic (polycarbonate) enclosure that allowed: isolation of the high-voltage unit, observation of the injector spray pattern, and collection of residual fuel. Iso-octane (a common surrogate for gasoline) was used as the input fuel.

The test was conducted in two stages: first, fuel was injected without a nonthermal plasma present and analyzed with a residual gas analyzer; second, fuel was injected with a nonthermal plasma present and analyzed with a residual gas analyzer. The results were then compared to determine the distribution of products with and without the influence of the plasma.

An electric fuel pump was used to, delivered liquid iso-octane to the fuel injector at a pressure of about 80 psig. While injecting the iso-octane (8 pulse shots), the resulting iso-octane spray mass spectrum coming out of the PACFI unit was measured using a residual gas analyzer. The mass peaks that were obtained were then compared with reference mass-spectral data to confirm the signature peaks for iso-octane. Common signature mass peaks, such as M29, M41, M43, and M57, were observed, appearing in the measuring range from 1 to 65 amu of the instrument.

In the second stage, the plasma reactor was activated using a power supply with an AC frequency of 566 Hz and voltage of 10±0.5 kV. The delivered nonthermal plasma power was about 2±0.5 W. Pressurized iso-octane was again sprayed from the injector and analyzed with the residual gas analyzer, providing the mass spectrum of a sample collected from the chamber. The test was repeated twice more, providing a total of three datasets for fuel only runs and three datasets for fuel with nonthermal plasma runs. These six datasets are normalized to the signal of mass 28 (nitrogen) in order to provide a simple means of comparing the strengths of the peaks on a common scale.

FIG. 5 shows two averaged datasets, one for a fuel only run (shaded) and one for a fuel with plasma run (closed circles). With just 2 W of plasma power, increased iso-octane fragment peaks are observed especially for the lower mass peaks M15, M27, M29, M39, M41, M43, M56, and M57. For example, the molecular formula of M29 is $CH_2$—$CH_3$. The increased M29 implies that the plasma cracked the iso-octane and produced more $CH_2$—$CH_3$, which is an easily burnable species. The fact that significant increases in these lower-mass peak signals were observed in the presence of the plasma confirms that the PACFI unit cracks the more-complicated hydrocarbon gasoline-surrogate (iso-octane) into smaller fragments. Furthermore, because there is very little change in the M2 peak (hydrogen) with the plasma, our invention is distinguished from those prior art inventions taught in Cohn et al., and Kong et al., which are fuel converters (mainly to hydrogen), rather than fuel "crackers" and active-species producers.

Internal Combustion Configurations

The following are illustrations of possible internal combustion (IC) engine configurations for using the present invention PACFI device, but are not limited to these examples. Engine types can include, conventional fuel injected gasoline engines, diesel IC engines, turbine engines and in fact any engine that utilizes fuels in liquid or low melting-point form (kerosene, jet fuels, gasoline, diesel, heating oils etc.) or gaseous forms (LP, propane, methane, marsh gases, LNG, natural gas etc.).

Figure 6:
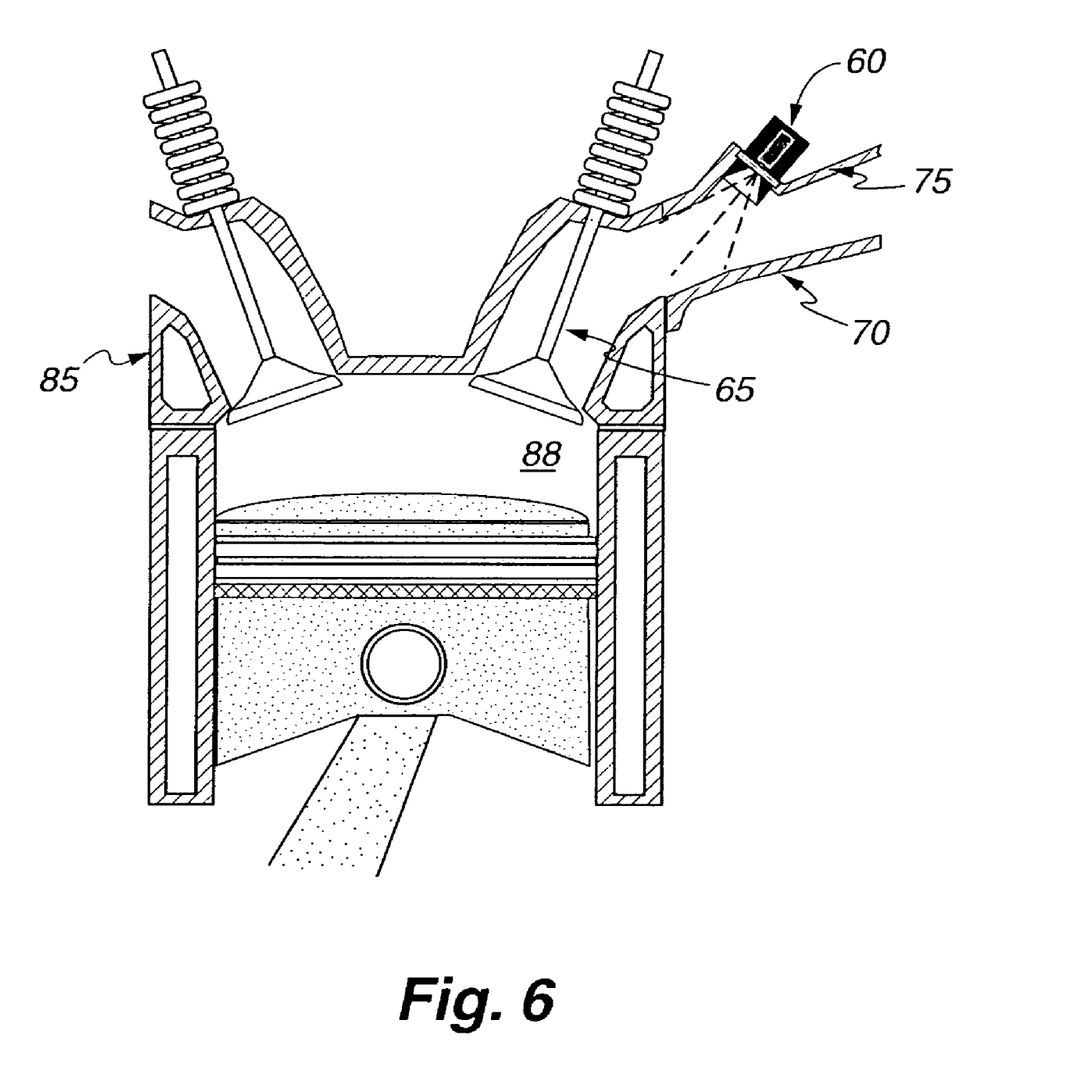
FIG. 6 pictorially shows a cross section of an internal IC engine port fuel injection configuration for mounting the PACFI.

Referring now to FIG. 6 showing is a cross section of an internal IC engine port fuel injection configuration for mounting the PACFI. Here, the PACFI is a direct replacement for a conventional fuel injection device, but has additional wiring to supply the high voltage AC to drive the plasma component. PACFI 60 is mounted in port 75 of intake manifold 70 and sprays the plasma treated fuel mist in the direction of intake valve 65.

Figure 7:
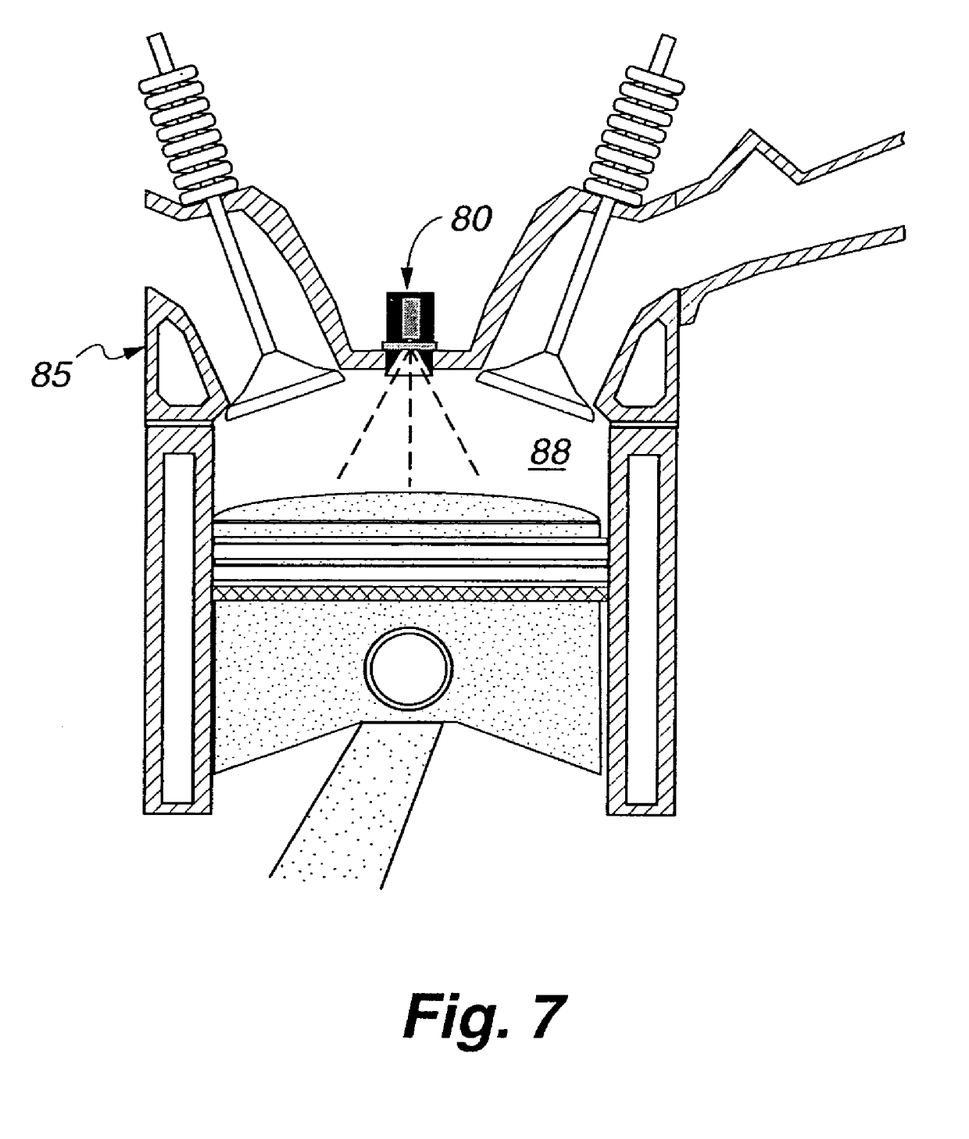
FIG. 7 pictorially shows a direct injection configuration for mounting the PACFI.

Referring now to FIG. 7, showing a direct injection configuration that is quite similar to a diesel engine's configuration. PACFI 80 is mounted in cylinder head 85 of the engine and is centrally located so that the plasma treated fuel is directed down into engine cylinder 88. Note that use in a diesel engine would require a higher-pressure PACFI device as the fuel is continuously injected during combustion.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A non-thermal plasma assisted combustion fuel injector, comprising:
   a. an outer electrode and an inner electrode that provide surfaces to create an electric field therebetween;
   b. a high voltage power supply configured to induce said electric field and to create a non-thermal plasma between the inner and outer electrodes;
   c. a dielectric material, operatively disposed between said outer electrode and said inner electrode to prevent arcing and promote the formation of said non-thermal plasma; and,
   d. a fuel injector configured to convert a liquid fuel into a dispersed mist, vapor, or aerosolized fuel; and disposed to subject said converted fuel to said non-thermal plasma.

2. The non-thermal plasma assisted combustion fuel injector of claim 1, where said inner electrode is configured as a basket.

3. The non-thermal plasma assisted combustion fuel injector of claim 1, where said inner electrode is configured as a needle.

4. The non-thermal plasma assisted combustion fuel injector of claim 1, where said inner electrode is configured as a brush.

5. The non-thermal plasma assisted combustion fuel injector of claim 1, where said inner electrode is configured as a spiral wire.

6. The non-thermal plasma assisted combustion fuel injector of claim 1, where said inner electrode is configured as a cone with electric field-enhancing perforations throughout.

7. The non-thermal plasma assisted combustion fuel injector of claim 1, where said inner electrode is configured as a cylinder with electric field-enhancing perforations throughout.

8. The non-thermal plasma assisted combustion fuel injector of claim 1, where said inner electrode is configured as a series of pointed washers.

9. The non-thermal plasma assisted combustion fuel injector of claim 1, where said inner and said outer electrodes are made from material selected from the group consisting of stainless steel alloys, tungsten, tungsten alloys, refractory metals, carbon-based composites, carbon nanotubes, and graphitic surfaces.

10. The non-thermal plasma assisted combustion fuel injector of claim 1, where said dielectric material is selected from the group consisting of alumina, porcelain, machinable glass ceramic, glasses, high temperature plastics, polimides and polyamides, and rubber compounds.

11. The non-thermal plasma assisted combustion fuel injector of claim 1, where said power supply operates in a range of about 1 to 50 kV and of about 10 Hz to 20 kHz.

12. The non-thermal plasma assisted combustion fuel injector of claim 1, where said inner electrode and said outer electrode are spaced apart in a range of about 0.5 mm to 20 mm.

13. The non-thermal plasma assisted combustion fuel injector of claim 1, where said outer electrode is configured in a conical shape.

14. The non-thermal plasma assisted combustion fuel injector of claim 1, where said outer electrode resides within said dielectric material.

15. The non-thermal plasma assisted combustion fuel injector of claim 1, where said non-thermal plasma assisted combustion fuel injector is mounted in a port fuel injection configuration.

16. The non-thermal plasma assisted combustion fuel injector of claim 1, where said non-thermal plasma assisted combustion fuel injector is mounted in a cylinder head configuration.

* * * * *